(12) United States Patent
Hans et al.

(10) Patent No.: US 7,200,575 B2
(45) Date of Patent: Apr. 3, 2007

(54) MANAGING ACCESS TO DIGITAL CONTENT

(75) Inventors: Mathieu C. Hans, Athens, GA (US); Gary D. Sasaki, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

(21) Appl. No.: 09/795,990

(22) Filed: Feb. 27, 2001

(65) Prior Publication Data

US 2002/0120577 A1 Aug. 29, 2002

(51) Int. Cl.
*G06Q 99/00* (2006.01)
*H04K 1/00* (2006.01)
*H04L 9/00* (2006.01)

(52) U.S. Cl. ............................ 705/59; 705/1; 705/51; 705/52; 705/53; 705/56; 705/57; 341/50; 707/32; 707/102; 707/103 R; 709/217; 709/219; 709/225; 709/231; 710/107; 725/86; 725/87; 725/131; 726/1

(58) Field of Classification Search ................. 705/59, 705/1, 51, 52, 53, 56, 57; 341/50; 707/32, 707/102–3; 709/217, 231; 725/86, 87, 131; 726/1; 710/107
See application file for complete search history.

(56) References Cited

U.S. PATENT DOCUMENTS

| | | | | |
|---|---|---|---|---|
| 5,629,980 A | * | 5/1997 | Stefik et al. ................. | 705/54 |
| 5,745,879 A | * | 4/1998 | Wyman ........................ | 705/1 |
| 5,758,068 A | * | 5/1998 | Brandt et al. ................ | 713/200 |
| 5,765,152 A | * | 6/1998 | Erickson ........................ | 707/9 |
| 5,790,664 A | * | 8/1998 | Coley et al. ................. | 709/203 |
| 5,905,860 A | * | 5/1999 | Olsen et al. ................. | 713/201 |
| 5,926,624 A | | 7/1999 | Katz et al. | |
| 5,982,891 A | | 11/1999 | Ginter et al. | |

(Continued)

FOREIGN PATENT DOCUMENTS

WO    WO 01/93154 A2 * 12/2001 .................. 705/59

OTHER PUBLICATIONS

"Myplay Makes the Holidays Sing with a Donation to City of Hope Every Time You 'Share Music'," PR Newswire Association, Inc., 2 pages, Dec. 15, 1999.

(Continued)

*Primary Examiner*—Bradley B. Bayat (57) ABSTRACT

Systems and methods of managing access to digital content are described. In one aspect, a novel digital content access management system enables users to register previously owned digital content and, subsequently, allows users to access the registered content using any electronic device that is connected to the system. Digital content may be pushed or pulled from any electronic system that is connected to a network—no matter where it is located—to any other electronic system that is connected to a network. A novel business model, as well as a system and a method for implementing this model, also are described. In accordance with this business model, payments are made to content providers upon registration of the previously owned digital content. In this way, the monetary interests of content providers may be protected (even when a user registers borrowed digital content, for example), while enhancing the ability of users to interact with their licensed digital content.

27 Claims, 4 Drawing Sheets

U.S. PATENT DOCUMENTS

| | | | | |
|---|---|---|---|---|
| 6,009,401 | A | * | 12/1999 | Horstmann .................... 705/1 |
| 6,073,124 | A | * | 6/2000 | Krishnan et al. ............. 705/59 |
| 6,170,014 | B1 | | 1/2001 | Darago et al. |
| 6,338,044 | B1 | * | 1/2002 | Cook et al. .................. 705/14 |
| 2001/0013024 | A1 | * | 8/2001 | Takahashi et al. ............ 705/59 |
| 2001/0044781 | A1 | * | 11/2001 | Shutes ........................ 705/59 |
| 2002/0010681 | A1 | * | 1/2002 | Hillegass et al. ............. 705/59 |
| 2002/0107809 | A1 | * | 8/2002 | Biddle et al. ................. 705/59 |

OTHER PUBLICATIONS

Paul Heltzel, "Access your CDs anywhere," PCWORLD.COM, 3 pages, Oct. 18, 1999.

Jennifer Balderama and Jeff Pelline, "Start-up Myplay tunes in to music downloads," 2 pages, Oct. 13, 1999.

* cited by examiner

MANAGING ACCESS TO DIGITAL CONTENT

TECHNICAL FIELD

This invention relates to systems and methods for managing access to digital content.

BACKGROUND

Various kinds of information may be presented in a digital content format, including audio, video, text, images and multimedia information. Digital content may be rendered by hardware playback devices and by computer systems operating software playback programs. Hardware playback devices typically are small, lightweight devices having a special purpose processor that renders the digital content stored in memory into audio output or visual output, or both. Software playback programs typically control the output functionality of a computer system to render digital content.

The convergence of technological advances in the compression, storage and transmission of digital data has resulted in a global communications network that allows digital content to be distributed rapidly to a large number of potential customers. At the same time, this technological convergence has enabled unprecedented quantities of digital content to be copied flawlessly and distributed to a large number of people. For example, users easily may exchange unprotected digital files by electronic mail or by direct file transfer over the Internet. Users also may access and download digital content posted on a web page using a conventional web browser application program executing on a computer system.

Digital content owners understandably are concerned about the potential theft and loss of control over the distribution of their works by and between unlicensed users. Cryptographic techniques have been developed to control the distribution of digital content. For example, digital content may be encrypted, and the encrypted content and a decryption key may be transmitted to licensed users. Licensed users may use the decryption key to access the encrypted digital content. External devices (e.g., tokens or dongles) also have been used to control the distribution of digital content. For example, a token or dongle may be required to be connected to a computer or other playback device before a licensed user may access the protected digital content. Still other systems and methods for controlling the distribution of digital content have been developed.

SUMMARY

The invention features a novel digital content access management system that enables users to register previously owned digital content and, subsequently, allows users to access the registered content using any electronic device that is connected to the system. Digital content may be pushed or pulled from any electronic system that is connected to a network—no matter where it is located—to any other electronic system that is connected to a network. In addition, the invention features a novel business model in accordance with which payments are made to content providers upon registration of the previously owned digital content. In this way, the monetary interests of content providers may be protected (even when a user registers borrowed digital content, for example), while enhancing the ability of users to interact with their licensed digital content.

In one aspect, the invention features a system for managing access to digital content that includes a rights manager residing on a server computer and configured to maintain for a user residing at a network node remote from the server computer a user profile containing selected user information, including a user license index identifying digital content licensed by the user.

Embodiments in accordance with this aspect of the invention may include one or more of the following features.

The rights manager preferably is configured to enable a user to register a license for digital content previously purchased by the user. The license may be registered based upon a content identifier associated with the purchased digital content. For example, the content identifier may be obtained from a recording medium on which the purchased digital content is stored. The rights manager also may be configured to maintain content usage information in the user profile.

The system also preferably includes an access manager that is configured to manage user access to digital content identified in the user license index. The access manager may be configured to provide access to digital content stored on a network node remote from the server computer and the user network node. For example, the access manager may be configured to provide access to remote digital content based upon a digital content index identifying remote network node addresses at which the remote digital content is stored. The access manager also may be configured to enable digital content to be formatted in accordance with a format designation received from the user. For example, the access manager may be configured to enable the digital content to be transmitted as a complete file or in a streaming file format. The access manager may be configured to enable transmission of digital content to a network node address that is different from the user network node in accordance with a destination node address received from the user.

The system also preferably includes a royalty manager that is configured to authorize payment to a digital content provider. The royalty payment manager may be configured to authorize payment in response to a digital content registration confirmation that is received from the rights manager. The authorized payment may correspond to a prescribed royalty fee schedule.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements;, and are not drawn to scale.

As used herein, "digital content"(or "digital work") refers broadly to any type of electronic content, including text, graphics, data, audio, and video content, and encompasses electronic information that may or may not be subject to copyright or other legal protection. In addition, the term "content provider" refers broadly to any digital content supplier that is entitled to receive a royalty payment for supplying digital content, including digital content owners, digital content aggregators, and digital content broadcasters.

Figure 1:
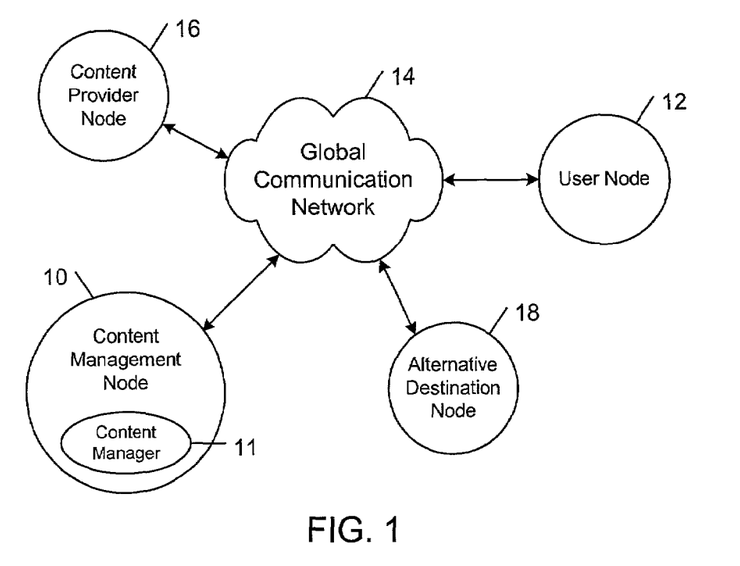
FIG. 1 is a diagrammatic view of a system for managing access to digital content.

Referring to FIG. 1, in one embodiment, a content management node 10 includes a content manager 11 that is configured to provide digital content access to an electronic playback device operating at a user node 12, which is connected to content management node 10 by a global communication network 14. In particular, content manager 11 is configured to maintain a user profile containing selected information about the user, including a user license index identifying digital content licensed by the user. The user license index may include digital content identifiers corresponding to digital content previously purchased by the user. The user profile also may include identifiers for non-purchased digital content, including royalty free commercial digital content and amateur digital content produced or compiled by users.

In response to a user request for access to a particular digital content, content manager 11 queries the user license index to determine if the user currently is licensed to access the requested digital content. If the user is licensed, content manager 11 enables the user to access the requested digital content. The digital content may be stored at content management node 10 or at a remote content provider node 16. In some embodiments, digital content may be compressed using a compression format that is selected based upon the digital content type (e.g., an MP3 or a WMA compression format for audio works, and an MPEG or an AVI compression format for audio/video works). The requested digital content may be formatted in accordance with a user-specified transmission format. For example, the requested digital content may be transmitted to the user in a format that is suitable for rendering by a computer, a wireless device, or a voice device. In addition, the requested digital content may be transmitted to the user as a complete file or in a streaming file format. The digital content may be transmitted to user node 12 or to an alternative destination node 18 in accordance with a destination node address received from user node 12. If the user is not previously licensed, content manager 11 may invite the user to purchase a license.

Transmissions between content manager 11, the users, and the content providers are conducted in accordance with one or more conventional secure transmission protocols. For example, each digital work transmission may involve packaging the digital work and any associated meta-data into an encrypted transfer file that may be transmitted securely from one participating entity to another.

In addition to providing user access to registered digital content, content manager 11 is configured to protect the financial interests of the content providers by transmitting a royalty fee payment to a content provider each time one of the content provider's works is registered. The royalty fee payments may be based upon a pre-negotiated royalty fee schedule. Funds needed to cover the royalty fees may be obtained directly from the user, or from subscription or advertising fees.

Figure 2:
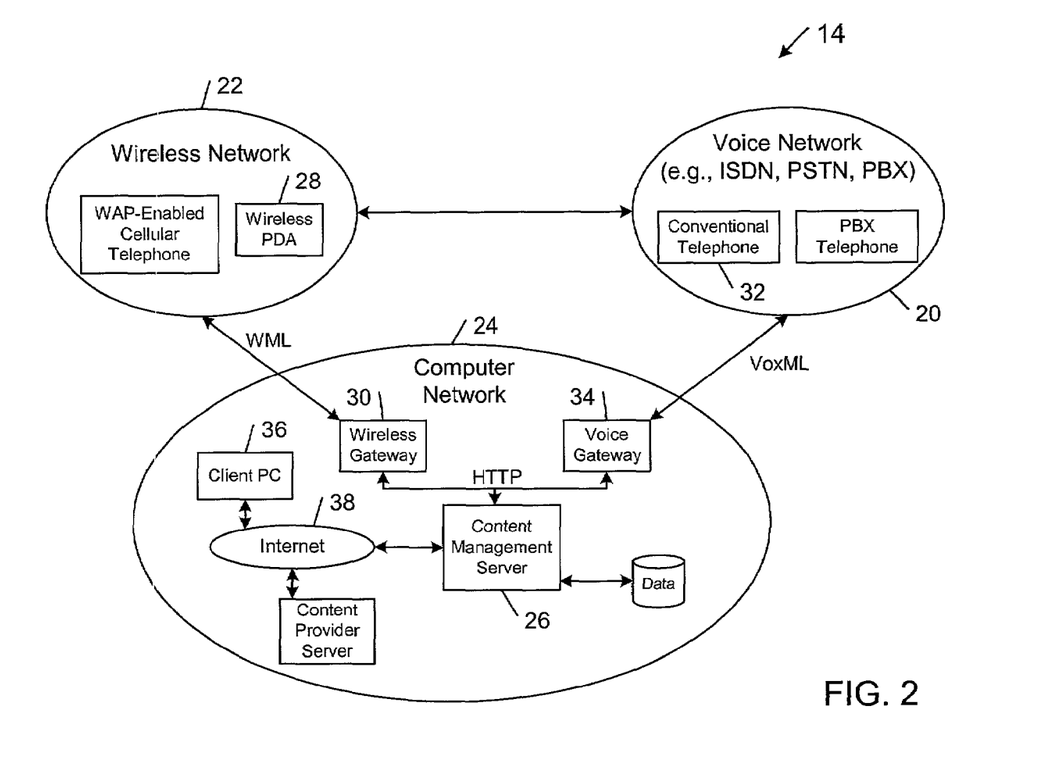
FIG. 2 is a diagrammatic view of a global communication network including a voice network, a computer network and a wireless network.

As shown in FIG. 2, global communication network 14 may include a number of different computing platforms and transport facilities, including a voice network 20, a wireless network 22 and a computer network 24. The digital content management services mentioned above may be provided through a content management server computer 26. Digital content access requests may be made, and requested digital content may be presented in a number of different media formats, such as voice, Internet, e-mail and wireless formats. In this way, content management server computer 26 enables a wide variety of different electronic playback devices to access digital content over global communication network 14. For example, in one illustrative implementation, a wireless device 28 (e.g., a wireless personal digital assistant (PDA)) may connect to server computer 26 over wireless network 22. Communications from wireless device 28 may be in accordance with the Wireless Application Protocol (WAP). A wireless gateway 30 converts the WAP communications into HTTP messages that may be processed by server computer 26. In another illustrative implementation, a voice device 32 (e.g., a conventional telephone) may connect to server computer 26 over voice network 20. Communications from voice device 32 may be in the form of conventional analog or digital audio signals, or they may be formatted as VoxML messages. A voice gateway 34 may use speech-to-text technology to convert the audio signals into HTTP messages; VoxML messages may be converted to HTTP messages based upon an extensible style language (XSL) style specification. Voice gateway 34 also may be configured to receive from server 26 real time audio messages that may be passed directly to voice device 32, or formatted messages (e.g., VoxML, XML, WML, e-mail) that must be converted to a real time audio format (e.g., using text-to-speech technology) before the messages may be passed to voice device 32. In a third illustrative implementation, a playback software program operating at a client personal computer (PC) 36 may access the digital content management services of server computer 26 over the Internet 38.

Thus, content manager 11 may provide access to digital content in a variety of different ways. In one embodiment, content manager 11 may operate an Internet web site that may be accessed by a conventional web browser application program executing, on a user's computer system. The web site may present a collection of previously licensed and un-licensed digital content that is indexed and categorized according to traditional criteria (e.g., genre, author, title, top-selling, recommended selections). The web site also may provide additional information relating to the available digital content, including user ratings and reviews. Users may playback previously licensed digital content on the fly using a playback software application program. In addition, users may download previously licensed digital content using a web browser application program and playback the digital content later using the same playback software application program. Users also may transfer the downloaded digital content to an appropriately configured portable media device (e.g., the portable media device described in pending U.S. patent application Ser. No. 09/741,725 filed Dec. 19, 2000, by Gary D. Sasaki and Mathieu C. Hans, and entitled "DISTRIBUTING DIGITAL CONTENT") that is configured to playback digital content stored in the device. In an alternative embodiment, a traditional brick-and-mortar retail establishment (e.g., a bookstore or a music store) may contain one or more kiosks (or content preview stations). The kiosks may be configured to communicate with content manager 11 (e.g., over a network communication channel) to provide user access to previously licensed digital content that may be rendered at the kiosk or transferred to a user's portable media device for later playback. A kiosk may include a computer system with a graphical user interface that enables users to navigate through a collection of previously licensed and un-licensed digital content that is stored locally at the retail establishment or that is stored remotely and is retrievable over a network communication channel. A kiosk also may include a cable port that a user may connect to a portable media device for downloading selected digital content.

Figure 3:
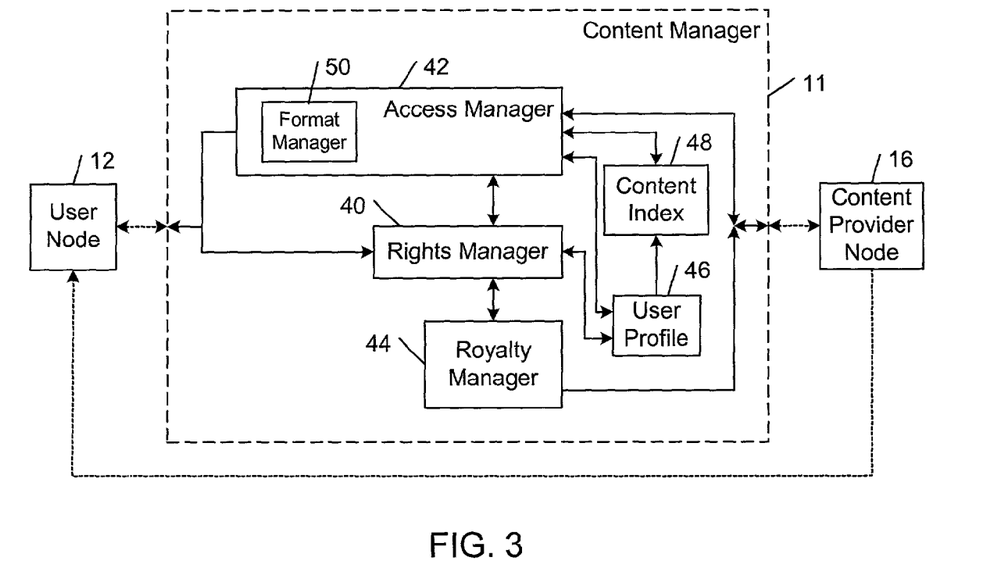
FIG. 3 is a block diagram of a content manager that is configured to provide user access to digital content that is stored on a remote content provider server.

As shown in FIG. 3, in one embodiment, content manager 11 may be implemented as a number of service modules that cooperate to provide user access to digital content. In particular, content manager 11 includes a rights manager 40, an access manager 42, and a royalty manager 44. Rights manager 40 is configured to maintain a user profile 46 for each user that is registered with content manager 11. Each user profile 42 contains selected user information (e.g., user name, password, e-mail address, billing information), including a user license index identifying digital content previously purchased by the user and registered with content manager 11. Access manager 42 is configured to enable transmission of digital content that is requested by a user and is identified in the user's personal profile 46. As mentioned above, the requested digital content may be retrieved from a content library that is stored at content management node 10 or the requested digital content may be transmitted from a remote content provider. With respect to digital content stored at content management node 10, access manager 42 is configured to format the requested digital content in accordance with a format designation received from the user. In particular, access manager 42 includes a format manager 50 that is configured to convert the requested digital content into a format that is suitable for rendering by, for example, a computer, a portable media player, a wireless device, or a voice device. In addition, format manager 50 is configured to transmit the requested digital content as a complete file or in a streaming file format. With respect to digital content stored at a remote content provider, access manager 42 may consult a digital content index 48 that identifies remote network node addresses at which the digital content is stored and authorize transmission of the requested digital content from the remote network node to the user. The content provider may be configured to format the digital content in accordance with a user-specified format that is received from access manager 42. The content provider also may include meta data (e.g., a watermark or other identifier) with the transmitted digital content. Royalty manager 44 is configured to authorize payment to a digital content provider in response to a digital content registration confirmation received from rights manager 40. As explained above, the amount of the authorized payment may be determined from a pre-negotiated royalty fee schedule.

Figure 4:
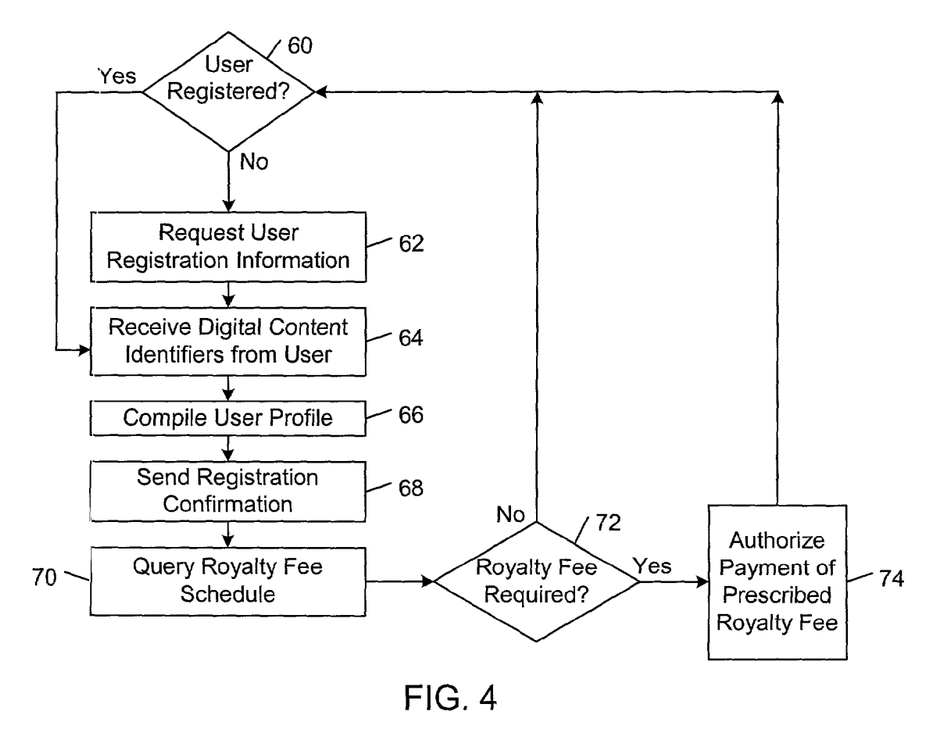
FIG. 4 is a flow diagram of a method of registering a user, maintaining a user profile, and authorizing payment to a digital content provider.

Referring to FIG. 4, in one embodiment, content manager 11 may register a user, maintain a user profile and authorize payment to a digital content provider, as follow. If the user is not registered (step 60), rights manager 40 registers the user by requesting selected user registration information (step 62). After the user has registered, the user is invited to upload one or more content identifiers corresponding to digital content previously purchased by the user (step 64). The content identifiers may be obtained from, for example, a recording medium on which the purchased digital content is stored. For example, the content identifiers may be unique album keys that typically are stored on commercial music compact discs (CDs). Each content identifier typically corresponds to only several bytes of data. Thus, because a user is not required to transmit the actual digital content to content manager 11, the user easily may register an entire library of digital content in a relatively short time. In addition, because relatively little storage space is required for each content identifier, there is essentially no limit to the quantity of digital content that may be accessed through content manager 11. After the user has registered his or her previously purchased digital content (step 64), rights manager 40 compiles a personal profile 46 for the user (step 66). In addition, rights manager 40 sends to royalty manager 44 a digital content registration confirmation for each digital work that is registered by the user (step 68). Royalty manager 44 queries an appropriate royalty fee schedule to determine if a royalty fee is required for each registered work and, if so, to determine the amount of the required royalty fee (step 70). If royalty fees are required (step 72), royalty manager 44 authorizes payment of the prescribed royalty fees to the appropriate content providers (step 74).

Figure 5:
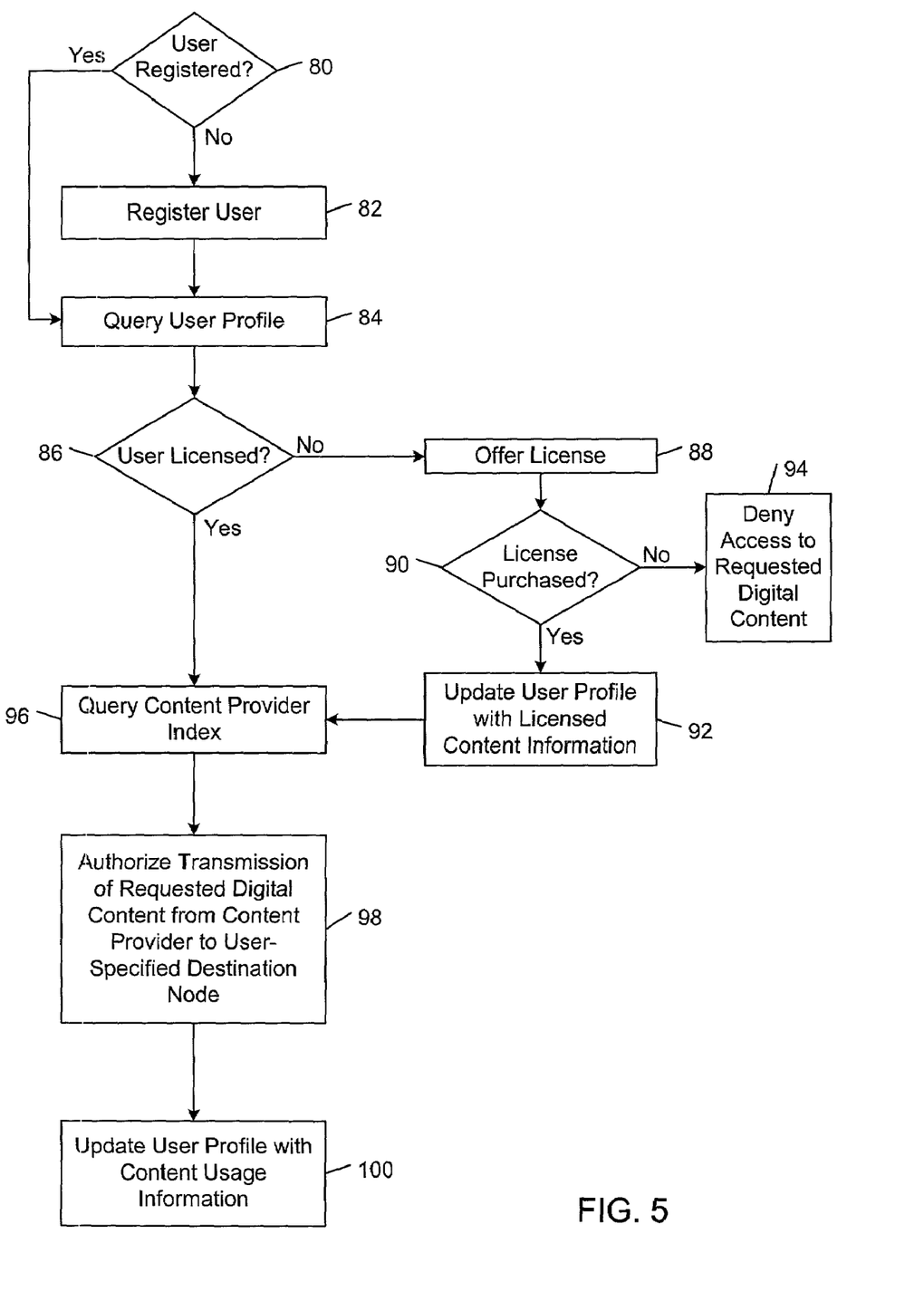
FIG. 5 is a flow diagram of a method of providing user access to digital content that is stored on a remote content provider server.

Referring to FIG. 5, in one embodiment, content manager 11 may enable a user to access digital content stored on a remote content provider server, as follows. If the user is not registered (step 80), rights manager 40 registers the user as described above (step 82). After the user is registered, rights manager 40 queries the personal profile 46 that is associated with the user to determine whether the user is licensed to access a requested digital work (step 84). If the user is not licensed (step 86), rights manager 40 may invite the user to purchase a license (step 88). If the user purchases a license (step 90), rights manager 40 updates the user's personal profile 46 with the content identifier associated with the licensed digital work (step 92); otherwise, the user is denied access to the requested digital content (step 94). If the user is licensed to access the requested digital content (step 86), access manager 42 queries the content provider index 48 for the network node address at which the requested digital work is stored (step 96). Access manager 42 authorizes transmission of the requested digital content from the remote node address to the user node (step 98). As explained above, the content provider may format the requested digital content in accordance with a user-specified format designation received from access manager 42. The content provider then transmits the formatted digital content (along with any additional meta data) to a destination node address specified by the user. The destination node address may correspond to the user's network node address in a pull mode of operation, or the destination node address may correspond to a different network node address in a push mode of operation. In some embodiments, rights manager 40 may update the user's personal profile 46 with information relating to the user's content usage patterns (e.g., the digital content accessed, the number of times particular works are accessed, the digital content genres accessed) (step 100). This information may be accessed by the user or, with the user's permission, may be shared with third parties (e.g., content providers) in exchange for one or more incentives (e.g., discounts on future purchases).

The systems and methods described herein are not limited to any particular hardware, firmware or software configuration, but rather they may be implemented in any computing or processing environment. The digital content management service processes described above may be implemented in a high-level procedural or object oriented programming language, or in assembly or machine language; in any case, the programming language may be a compiled or interpreted language.

Figure 6:
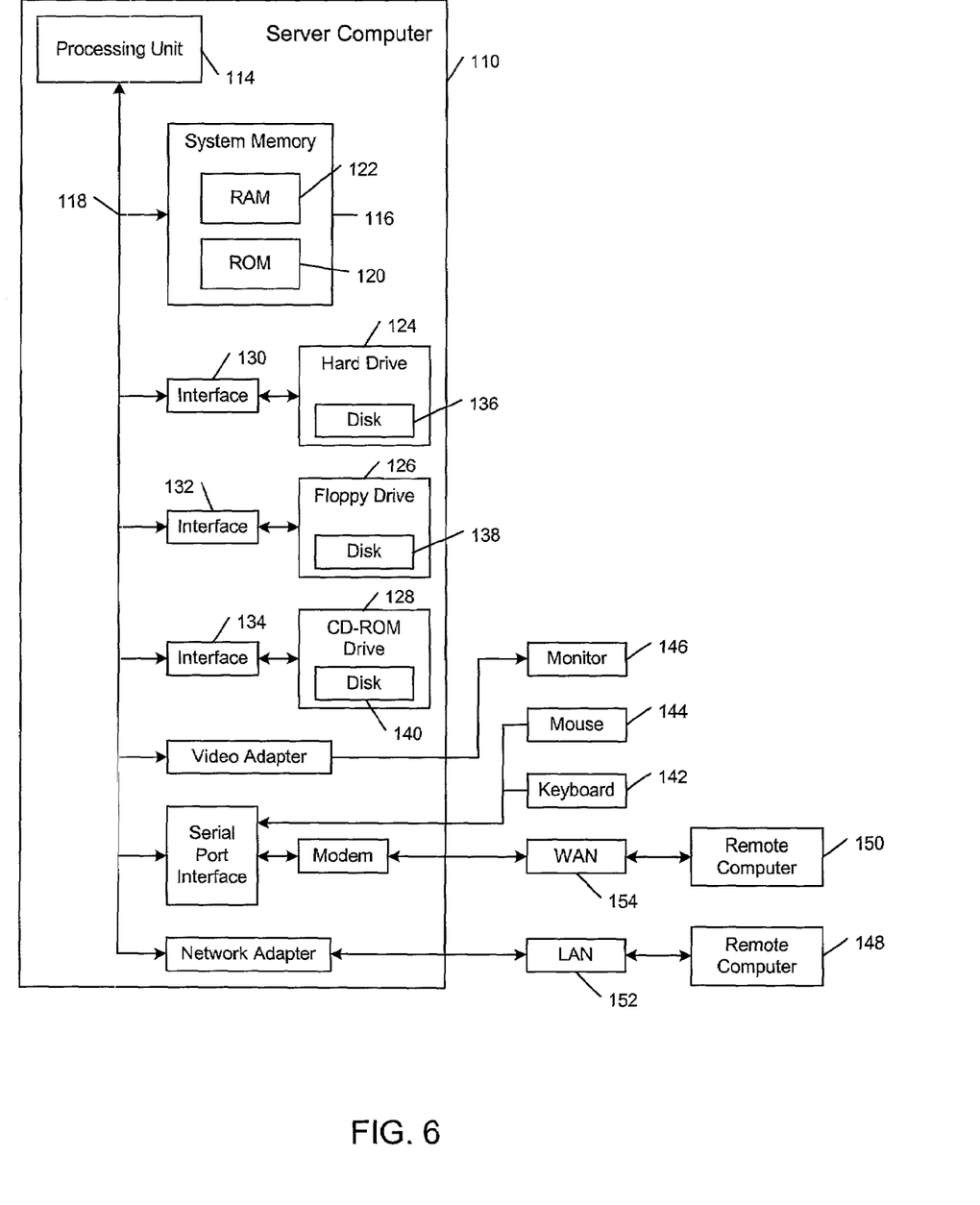
FIG. 6 is a block diagram of a server computer.

Referring to FIG. 6, in one embodiment, content manager 11, the user playback devices, and the content providers may communicate and pass digital content over a conventional distribution network infrastructure (e.g., the Internet or a proprietary bulletin board service infrastructure). Accordingly, in this embodiment, each of these entities may be implemented as one or more respective software modules operating on a respective server computer 110 that is connected to a conventional telephone or cable network. Server computer 110 includes a processing unit 114, a system memory 116, and a system bus 118 that couples processing unit 114 to the various components of server computer 110. Processing unit 114 may include one or more processors, each of which may be in the form of any one of various commercially available processors. System memory 116 includes a read only memory (ROM) 120 that stores a basic input/output system (BIOS) containing start-up routines for server computer 110, and a random access memory (RAM) 122. System bus 118 may be a memory bus, a peripheral bus or a local bus, and may be compatible with any of a variety of bus protocols, including PCI, VESA, Microchannel, ISA, and EISA. Server computer 110 also includes a hard drive 124, a floppy drive 126, and CD ROM drive 128 that are connected to system bus 118 by respective interfaces 130, 132, 134. Hard drive 124, floppy drive 126, and CD ROM drive 128 contain respective computer-readable media disks 136, 138, 140 that provide non-volatile or persistent storage for data, data structures and computer-executable instructions. Other computer-readable storage devices (e.g., magnetic tape drives, flash memory devices, and digital video disks) also may be used with server computer 110. A user may interact (e.g., enter commands or data) with server computer 110 using a keyboard 142 and a mouse 144. Other input devices (e.g., a microphone, joystick, or touch pad) also may be provided. Information may be displayed to the user on a monitor 146. Server computer 110 also may include peripheral output devices, such as speakers and a printer. One or more remote computers 148 may be connected to server computer 110 over a local area network (LAN) 152, and one or more remote computers 150 may be connected to server computer 110 over a wide area network (WAN) 154 (e.g., the Internet 38).

Other embodiments are within the scope of the claims.

In addition to formatting digital content, content manager 11 may be configured to provide a number of other value-added services to enhance a user's ability to interact with digital content. For example, content manager 11 may be configured to allow a user to create playlists or otherwise organize the digital content that is registered with content manager 11. Content manager 11 also may be configured to provide other services, including pay-per-listen, try-before-you-buy, personalized broadcasting, integration with live content, alerting of new content or events, purchasing live content, CD burning, and downloading to solid state portable players.

Still other embodiments are within the scope of the claims.

What is claimed is:

1. A system for managing access to digital content, comprising:
a rights manager residing on a server computer and configured to maintain for a user residing at a network node remote from the server computer a user profile containing selected user information, including a user license index identifying digital content licensed by the user, wherein the rights manager is configured to enable a user to register a license for digital content previously purchased by the user.

2. The system of claim 1, wherein the license is registered based upon a content identifier associated with the purchased digital content.

3. The system of claim 2, wherein the content identifier is obtained from a recording medium on which the purchased digital content is stored.

4. The system of claim 1, wherein the rights manager is configured to maintain content usage information in the user profile.

5. The system of claim 1, further comprising an access manager configured to manage user access to digital content identified in the user license index.

6. The system of claim 5, wherein the access manager is configured to provide access to digital content stored on a network node remote from the server computer and the user network node.

7. The system of claim 6, wherein the access manager is configured to provide access to remote digital content based upon a digital content index identifying remote network node addresses at which the remote digital content is stored.

8. The system of claim 5, wherein the access manager is configured to enable formatting of digital content in accordance with a format designation received from the user.

9. The system of claim 8, wherein the access manager is configured to enable transmission of the digital content as a complete file or in a streaming file format.

10. A system for managing access to digital content, comprising:
a rights manager residing on a server computer and configured to maintain for a user residing at a network node remote from the server computer a user profile containing selected user information, including a user license index identifying digital content licensed by the user; and
an access manager configured to manage user access to digital content identified in the user license index, wherein the access manager is configured to enable transmission of digital content to a network node address different from the user network node in accordance with a destination node address received from the user.

11. The system of claim 1 further comprising a royalty manager configured to authorize payment to a digital content provider.

12. A system for managing access to digital content, comprising:
a rights manager residing on a server computer and configured to maintain for a user residing at a network node remote from the server computer a user profile containing selected user information, including a user license index identifying digital content licensed by the user; and
a royalty manager configured to authorize payment to a digital content provider, wherein the royalty manager is configured to authorize payment in response to a digital content registration confirmation received from the rights manager.

13. The system of claim 12, wherein the authorized payment corresponds to a prescribed royalty fee schedule.

14. A method of managing access to digital content, comprising:
  maintaining on a server computer a user profile for a user residing at a network node remote from the server computer, the user profile containing selected user information, including a user license index identifying digital content licensed by the user; and
  enabling a user to register a license for digital content previously purchased by the user.

15. The method of claim 14, wherein the license is registered based upon a content identifier associated with the purchased digital content.

16. The method of claim 14, further comprising authorizing payment to a digital content provider.

17. The method of claim 16, wherein the payment is authorized upon registration of digital content.

18. The method of claim 16, wherein the authorized payment corresponds to a prescribed royalty fee schedule.

19. The system of claim 11 wherein the rights manager is configured to receive content identifiers uploaded from a user device connected to the remote network node.

20. The system of claim 19, wherein each content identifier corresponds to an album key assigned to a respective music compact disk.

21. The system of claim 2, wherein each content identifier is an album key assigned to a respective music compact disk.

22. The system of claim 11, wherein the royalty manager is configured to determine if a royalty fee is required for each digital content identified in the user license index.

23. The method of claim 14, further comprising receiving content identifiers uploaded from a user device connected to the remote network node.

24. The method of claim 23, wherein each content identifier is an album key assigned to a respective music compact disk.

25. The method of claim 14, wherein each content identifier corresponds to an album key assigned to a respective music compact disk.

26. The method of claim 14, further comprising formatting digital content in accordance with a format designation received from the user.

27. A method of managing access to digital content, comprising:
  maintaining on a server computer a user profile for a user residing at a network node remote from the server computer, the user profile containing selected user information, including a user license index identifying digital content licensed by the user; and
  transmitting digital content to a network node address different from the user network node in accordance with a destination node address received from the user.

* * * * *

UNITED STATES PATENT AND TRADEMARK OFFICE
CERTIFICATE OF CORRECTION

| | | |
|---|---|---|
| PATENT NO. | : 7,200,575 B2 | Page 1 of 1 |
| APPLICATION NO. | : 09/795990 | |
| DATED | : April 3, 2007 | |
| INVENTOR(S) | : Mathieu C. Hans et al. | |

It is certified that error appears in the above-identified patent and that said Letters Patent is hereby corrected as shown below:

In column 8, line 34, in Claim 10, delete "content." and insert -- content, --, therefor.

In column 8, line 49, in Claim 11, after "claim 1" insert -- , --.

In column 9, line 19, in Claim 19, delete "claim 11" and insert -- claim 1, --, therefor.

Signed and Sealed this

Seventeenth Day of November, 2009

David J. Kappos
*Director of the United States Patent and Trademark Office*